W. H. SMITH.
PROCESS FOR MAKING ARTIFICIAL STONE.
No. 178,340. Patented June 6, 1876.
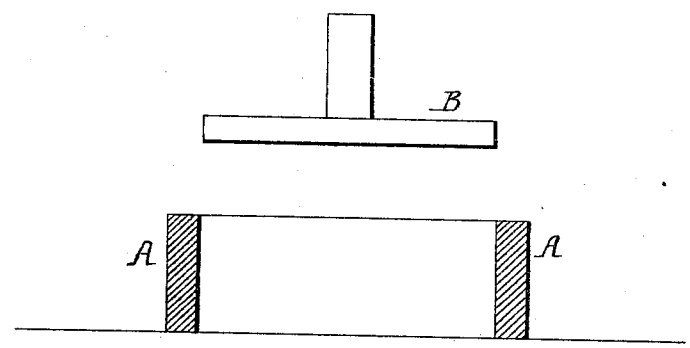
Witnesses,
Harry Howson Jr.
Harry Smith
William Harrold Smith
by his Attorneys
Howson and Son

UNITED STATES PATENT OFFICE.

WILLIAM H. SMITH, OF PHILADELPHIA, PENNSYLVANIA.

IMPROVEMENT IN PROCESSES FOR MAKING ARTIFICIAL STONE.

Specification forming part of Letters Patent No. 178,340, dated June 6, 1876; application filed May 2, 1876.

*To all whom it may concern:*

Be it known that I, WILLIAM HARROLD SMITH, of Philadelphia, Pennsylvania, have invented a Process for Making Artificial Stone, of which the following a specification:

The object of my invention is to convert a mixture of granulated or pulverized mineral ingredients into artificial stone, by subjecting the same, while in a condition described hereafter, to impact in molds.

In carrying out my invention, any granulated or pulverized stone, or fine or coarse sand, or any mineral substances, may be used, the degree of fineness to which they should be reduced depending partly upon the texture of the artificial stone to be made, and partly on the character of the mineral ingredients.

In connection with the comminuted mineral lime, or any of the ordinary mineral cements of commerce, may be used, the proportions of the ingredients being varied as their character and the texture of the desired stone may suggest.

When lime is used as one of the ingredients, sufficient water should be thrown onto a mass of the lime to reduce it to a powdered condition, after which the powdered lime should be passed through a sieve having about eighteen meshes to the inch.

If any of the ordinary mineral cements of commerce are employed, no preliminary treatment is necessary, other than that which they received in preparing them for the market.

I have produced sound blocks of artificial stone by mixing together two parts of granulated or pulverized marble chips, and one part of the lime, and subjecting the mixture to the process described hereafter. I have also made blocks of pulverized slag or scoria, and the ordinary cement of commerce, and of fine sand and lime, coarse sand and cement, and of pulverized sand, stone, and lime, using different proportions of the ingredients.

It may be stated here, however, that I neither desire to claim or to limit myself in this application to any specific mineral ingredients or cements, or to any specific proportions of the same, my present invention being directed to the preparation and treatment of mixtures composed partly of granular or granulated or pulverized mineral substances, with limes or cements.

I prepare a metal mold of the desired size and shape—a mold, for instance, like that shown in the accompanying drawing, and marked A—and in connection with this mold I use a die, B, arranged to fit snugly, but slide freely, in the mold, both the latter and the die being preferably constructed in the manner described in an application for a patent filed by me December 27, 1875.

In my process of treating the mixture there are two branches, the first being the preliminary preparation of the material, and the second the condensation of the material by impact in the mold.

The first branch consists in imparting to the pulverized or granulated materials a proper degree of dampness, on which success depends, for without a strict observance of the rules relating to this preliminary branch of the process the second branch will be of no avail.

The mixture should not be made plastic, but should be reduced to such a condition, by the addition of a small proportion of water, that on pressing a mass in the hands the particles will barely cohere, or if they do cohere temporarily, will resume their granular condition on receiving a slight touch of the finger.

The desired quantity of material having been deposited in the mold, and the die adjusted in the latter on the material, the whole is placed on the anvil of a steam-hammer. The mass in the mold should not be subjected to violent impact in the first instance, but to a comparatively slight pressure or a few light blows, after which the heaviest blows may be imparted.

Quadrangular blocks, nine inches square and three inches thick, have been produced after a few preliminary light blows, by from five to eight blows of a hammer weighing two thousand five hundred pounds, and falling a distance of eighteen inches, the pressure of steam used in the cylinder of the hammer being sixty pounds per square inch.

This violent impact has a solidifying effect on the material, which I have not been able to impart by the application of the most forcible direct pressure, the effect being such that after the removal of the block from the mold, and exposing it to the air for about a week, the block will be in a condition to be used for building purposes. During this exposure of the block, water should be poured over it, or it should be dipped in water from time to time.

I wish it to be understood that I do not desire to claim the compacting of plastic material into molds, by a repetition of blows; but

I claim as my invention—

The mode or process herein described of manufacturing artificial stone—that is to say, by first moistening granulated or pulverized mineral substances to the extent herein described; and, second, while they are in this condition and in a mold, subjecting them first to comparatively slight pressure or light blows, and then to heavy blows through the medium of a die adapted to the mold, all as set forth.

In testimony whereof I have signed my name to this specification in the presence of two subscribing witnesses.

WILLIAM HARROLD SMITH.

Witnesses:
HARRY HOWSON, Jr.,
HARRY SMITH.